US011126780B1

(12) United States Patent
Chung et al.

(10) Patent No.: US 11,126,780 B1
(45) Date of Patent: Sep. 21, 2021

(54) AUTOMATIC NET GROUPING AND ROUTING

(71) Applicant: Synopsys, Inc., Mountain View, CA (US)

(72) Inventors: Yi-Ting Chung, Hsinchu (TW); Kuan-Yu Liao, Hsinchu (TW); Shih-Pin Hung, Zhubei (TW); Kaichih Chi, Hsinchu (TW); Bing Chen, Austin, TX (US); Chun-Cheng Chi, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/680,210

(22) Filed: Nov. 11, 2019

Related U.S. Application Data

(60) Provisional application No. 62/758,812, filed on Nov. 12, 2018.

(51) Int. Cl.
*G06F 30/30* (2020.01)
*G06F 30/3953* (2020.01)
*G06F 30/394* (2020.01)
*G06F 30/3947* (2020.01)
*G06F 115/02* (2020.01)

(52) U.S. Cl.
CPC ........ *G06F 30/3953* (2020.01); *G06F 30/394* (2020.01); *G06F 30/3947* (2020.01); *G06F 2115/02* (2020.01)

(58) Field of Classification Search
CPC ............... G06F 30/394; G06F 30/3947; G06F 30/3953; G06F 2115/02
See application file for complete search history.

(56) References Cited

U.S. PATENT DOCUMENTS

| 5,557,533 | A | 9/1996 | Koford et al. |
| 7,143,385 | B2 * | 11/2006 | Itou ........................ G06F 30/394 716/131 |
| 7,251,802 | B2 * | 7/2007 | Hachiya ................ G06F 30/394 716/126 |
| 7,793,249 | B1 * | 9/2010 | Wadland ............... G06F 30/394 716/129 |
| 7,856,610 | B2 * | 12/2010 | Kitano ................... G06F 30/394 716/129 |
| 8,060,849 | B2 | 11/2011 | He et al. |
| 8,095,903 | B2 | 1/2012 | Birch et al. |

(Continued)

OTHER PUBLICATIONS

D.H.-C. Du et al., "Heuristic Algorithms for Single Row Routing," IEEE Trans. on Computers, vol. C-36, No. 3, Mar. 1987, pp. 312-320. (Year: 1987).*

*Primary Examiner* — Leigh M Garbowski
(74) *Attorney, Agent, or Firm* — Park, Vaughan, Fleming & Dowler LLP; Laxman Sahasrabuddhe

(57) ABSTRACT

Techniques and systems for automatic net grouping and routing are described. Some embodiments can determine a set of net groups by automatically grouping nets that have (1) a same pin count, (2) a pin direction type that is in a predefined set of pin direction types, and (3) a pin order type that is in a predefined set of pin order types. Next, the embodiments can generate routing guidance by performing trunk planning for each net group. The embodiments can then perform detailed routing for each net in each net group by using the routing guidance.

20 Claims, 15 Drawing Sheets

(56) References Cited

U.S. PATENT DOCUMENTS

| | | | | |
|---|---|---|---|---|
| 8,504,977 | B1* | 8/2013 | Yen | G06F 30/394 |
| | | | | 716/137 |
| 8,601,425 | B2 | 12/2013 | Alpert et al. | |
| 8,793,643 | B2* | 7/2014 | Nishio | G06F 30/394 |
| | | | | 716/137 |
| 8,930,869 | B2* | 1/2015 | Ohtsuka | G06F 30/394 |
| | | | | 716/126 |
| 9,747,406 | B2* | 8/2017 | Lu | G06F 30/394 |
| 10,552,568 | B2* | 2/2020 | Chen | G06F 30/394 |
| 10,719,653 | B2* | 7/2020 | Lu | G06F 30/394 |
| 2008/0244495 | A1* | 10/2008 | Kajitani | G06F 30/394 |
| | | | | 716/126 |

* cited by examiner

Nets with an arbitrary pin ordering are not grouped together

AUTOMATIC NET GROUPING AND ROUTING

RELATED APPLICATION

This application claims benefit of U.S. Provisional Application Ser. No. 62/758,812, filed on 12 Nov. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to automatic net grouping and routing.

Related Art

Advances in process technology have fueled a rapid increase in the size and complexity of IC designs. This dramatic increase in complexity and integration densities has made it considerably more challenging to design ICs.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for automatic net grouping and routing.

Some embodiments can determine a set of net groups by automatically grouping nets that have (1) the same pin count, (2) a pin direction type that is in a predefined set of pin direction types, and (3) a pin order type that is in a predefined set of pin order types. Next, the embodiments can generate routing guidance by performing trunk planning for each net group. The embodiments can then perform detailed routing for each net in each net group by using the routing guidance. After performing detailed routing for each net in each net group by using the routing guidance, some embodiments can perform detailed routing on nets that are not in the set of net groups.

In some embodiments, the predefined set of pin direction types comprises a vertical-vertical pin direction type, a vertical-horizontal pin direction type, a horizontal-vertical pin direction type, and a horizontal-horizontal pin direction type. In some embodiments, the predefined set of pin order types comprises a same order type, a reverse order type, and an interleaved order type.

In some embodiments, generating the routing guidance comprises constructing a constraint graph, wherein the constraint graph is a directed graph comprising a set of nodes and a set of directed edges, wherein each node in the constraint graph represents a net group, and each directed edge in the constraint graph represents a routing resource constraint between two net groups. Some embodiments can determine a minimum number of tracks required for routing the set of net groups by determining a maximum-weighted path in the constraint graph. Some embodiments can re-group nets in response to determining that the minimum number of tracks is greater than a capacity of a channel (e.g., the number of available tracks in the channel) through which the net groups are to be routed.

DETAILED DESCRIPTION

Figure 1:
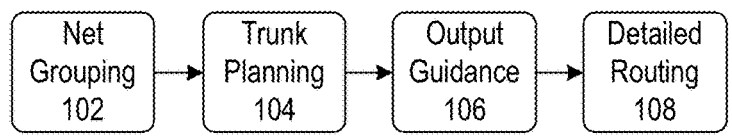
FIG. 1 illustrates a net grouping and routing process in accordance with some embodiments described herein.

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

Block-level and top-level IC designs include signal nets that connect different blocks. The free space between two blocks is called a channel. The nets are routed through these channels. The space in channels is limited, so if the routing of the nets is not well-organized, then the routing quality may be poor, and may require long runtimes to converge on a violation-free routing solution. In existing approaches, to obtain high quality planning and routing results, a user typically needs to guide the router by specifying which nets should be grouped and routed together. Such approaches require a user to create group information manually, which can cause these approaches to require several iterations of manual trial and error before a high quality grouping and routing is discovered. In existing approaches, a router engine has to rely on the user's input to know which nets should be grouped together. Also, there is no optimization process for routing those groups of nets. In existing approaches, users cut small regions from a system on a chip (SoC) design to be individual blocks for parallel implementation. Each block can require about two weeks for routing when using existing approaches, and an SoC design may need five iterations for revision. Thus, in existing approaches, routing a single SoC design can require several months.

Some embodiments described herein feature an automatic net grouping technique that groups bus-like nets and routes them together without requiring the user to specify the grouping or provide routing guidance. Excellent net grouping, planning, and routing results for top-level and block-level IC designs have been achieved by using embodiments described in this disclosure. In some embodiments described herein, a constraint graph module is used to determine routing order, and a trunk planning module identifies violations between trunks of nets. The embodiments can also include a module for a rip-up and re-planning process to reduce violations. Additionally, embodiments can efficiently utilize routing resources by using track sharing. The routing guidance generated by embodiments described herein provides a detailed router with high quality routing direction. The embodiments have produced high quality results for actual IC designs.

Some embodiments described herein can be used on block/top level IC designs. As mentioned above, embodiments can include modules for performing the following processes: grouping, planning, and routing. The grouping process analyzes pin count, direction, and their permutation on design/block boundaries. The grouping process is preformed if it is determined that some nets could be routed using a similar topology. To further improve the results, the net count of groups and channel size is considered to determine if a large net group should be split into several sub-groups. A constraint graph of net groups can be built to determine the minimum number of tracks that are required to route the net groups. If the required number of tracks is greater than the number of tracks in a channel, the embodiment can split large net groups into smaller net groups.

In the planning stage, the routing of nets in the same group is planned together. The constraint graph of net groups which is built in grouping stage is used to determine the routing order of net groups. A rip-up and re-planning process can be used to improve the congestion and violations between net trunks. Next, a detailed router can be invoked to route all nets under the guidance of the planned result.

Some embodiments described herein feature a new routing flow for routing top/block level IC designs to improve routing quality and performance. Specifically, some embodiments can automatically (i.e., without user intervention) group bus-like nets together based on net pin count, pin direction, pin orders, routing resource. The embodiments can consider all groups of nets together during planning, and perform rip-up and re-planning for groups of nets as needed. Additionally, embodiments can automatically detect corners and track sharing opportunities for bus trunks. In this manner, some embodiments described herein feature a fully automated flow that achieves results that are at least as good as, and often superior to, those achieved by existing approaches that rely on human guided routing and often require multiple trial and error iterations.

In some embodiments, the input to the process can be a block-level or top-level IC design that includes a set of nets that need to be routed. Specifically, the pins of the nets need to be on block or design boundaries. Some embodiments may not support standard cell pins; in these embodiments, if there are any standard cell pins in the input, then the embodiment can terminate and report an error. Embodiments can handle routing blockages in the IC design. In some embodiments, the output can be (1) a routed IC design that satisfies all design rules, and (2) grouping results, i.e., a set of net groups.

FIG. 1 illustrates a net grouping and routing process in accordance with some embodiments described herein. The process can begin by receiving a top/block level IC design which contains a list of open nets that are to be routed, and any other information that is required for performing the operations of the flow. Next, during net grouping (step 102), the process can analyze pins of nets and group nets into different groups. After net grouping, trunk planning (step 104) can be invoked to plan trunks corresponding to the net groups. The planning results can then be converted into routing guidance during the output guidance step 106. Finally, the routing guidance can be used to guide a router during the detailed routing step 108. Each of these steps is described in further detail below.

In net grouping step 102, bus-like nets are grouped into the same group so that the nets can be routed together. Net grouping step 102 creates better routing patterns with a more compact pattern, and increases routability and performance as well. In this step, the process tends to maximize the number of nets in a group and reduces the total number of groups. However, as explained below, the process may split a group into sub-groups, if that results in better track sharing (track sharing is discussed later in this disclosure). The automatic net grouping process analyzes pins of all nets, and then, processes initial net grouping according to the following factors: (1) pin count and direction, (2) pin order, (3) min/max net count, and (4) longest grouping distance. Each of these factors is described below with the help of figures. The net grouping process can use a set of predefined parameter values for the above factors (the predefined parameter values can also be overridden by user-specified values). In some embodiments, the process can perform net grouping based on different sets of parameter values, and select the best net grouping as the initial net grouping.

Figure 2A:
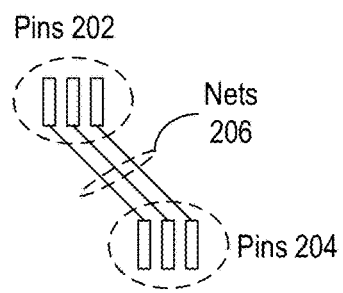
FIGS. 2A-2F illustrates how pin count and direction can be used to group nets in accordance with some embodiments described herein.
Figure 2B:
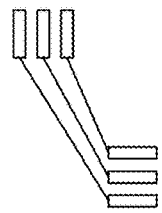
Figure 2C:
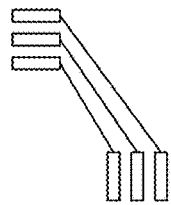
Figure 2D:
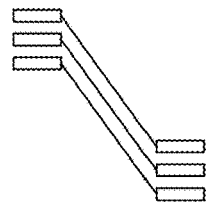
Figure 2E:
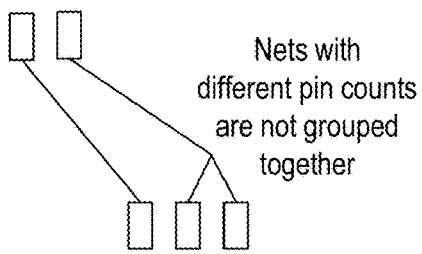
Figure 2F:
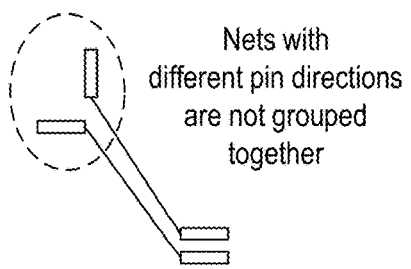

FIGS. 2A-2F illustrates how pin count and direction can be used to group nets in accordance with some embodiments described herein. Specifically, in some embodiments, only nets with the same pin count can be grouped together. For example, in FIG. 2A, nets 206 interconnect pins 202 with pins 204. For nets with the same pin count, embodiments can categorize nets in to four kinds of cases according to the pin directions: "VV," "VH," "HV," and "HH." The notation "VV" means that the left most pin and right most pin are vertical. The notation "VH" means that the left most pin is vertical and the right most pin is horizontal. Specifically, FIGS. 2A, 2B, 2C, and 2D illustrate "VV," "VH," "HV," and "HH" categories, respectively. FIG. 2E illustrates a case where one net has two pins and the other net has three pins. These two nets cannot be grouped together because their pin counts are different. FIG. 2F illustrates a case where one net is in the "HH" category and the other net is in the "VH" category. These two nets also cannot be grouped together because they are in different pin direction categories.

Figure 3A:
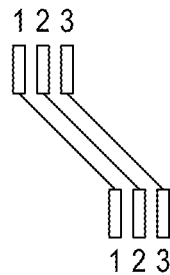
FIGS. 3A-3D illustrate different pin orderings that can be grouped together in accordance with some embodiments described herein.
Figure 3B:
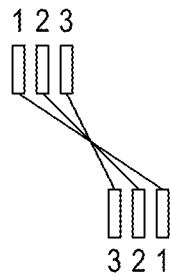
Figure 3C:
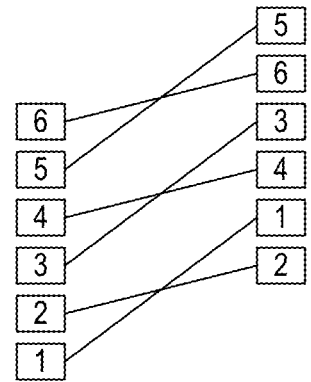
Figure 3D:
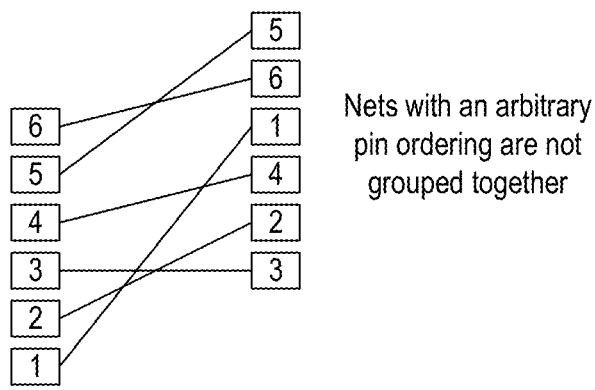

FIGS. 3A-3D illustrate different pin orderings that can be grouped together in accordance with some embodiments described herein. In some embodiments, in addition to the pin count and pin direction, only nets with the same pin order can be grouped together. Pin order means that the order of the permutation of pins are on the same design/macro boundary. Embodiments can support three kinds of permutations: (1) same order, (2) reverse order, and (3) interleave order. Specifically, FIG. 3A illustrates the "same order" category. Note that the top pins (labeled "123" in FIG. 3A) are connected to bottom pins in the same order. FIGS. 3B and 3C illustrate pins that have a "reverse order" and an "interleave order," respectively. FIG. 3D illustrates a case wherein the pin ordering does not fall into any of the three aforementioned categories. Thus, some embodiments described herein may not group the six nets shown in FIG. 3D because the pin ordering is arbitrary (i.e., it does not fall into any of the three aforementioned categories).

Nets that have the same pin ordering or a reverse pin ordering can be grouped together. For nets that have interleaved pin ordering, the embodiments can group them in different ways depending on default or user-specified parameters.

Figure 4:
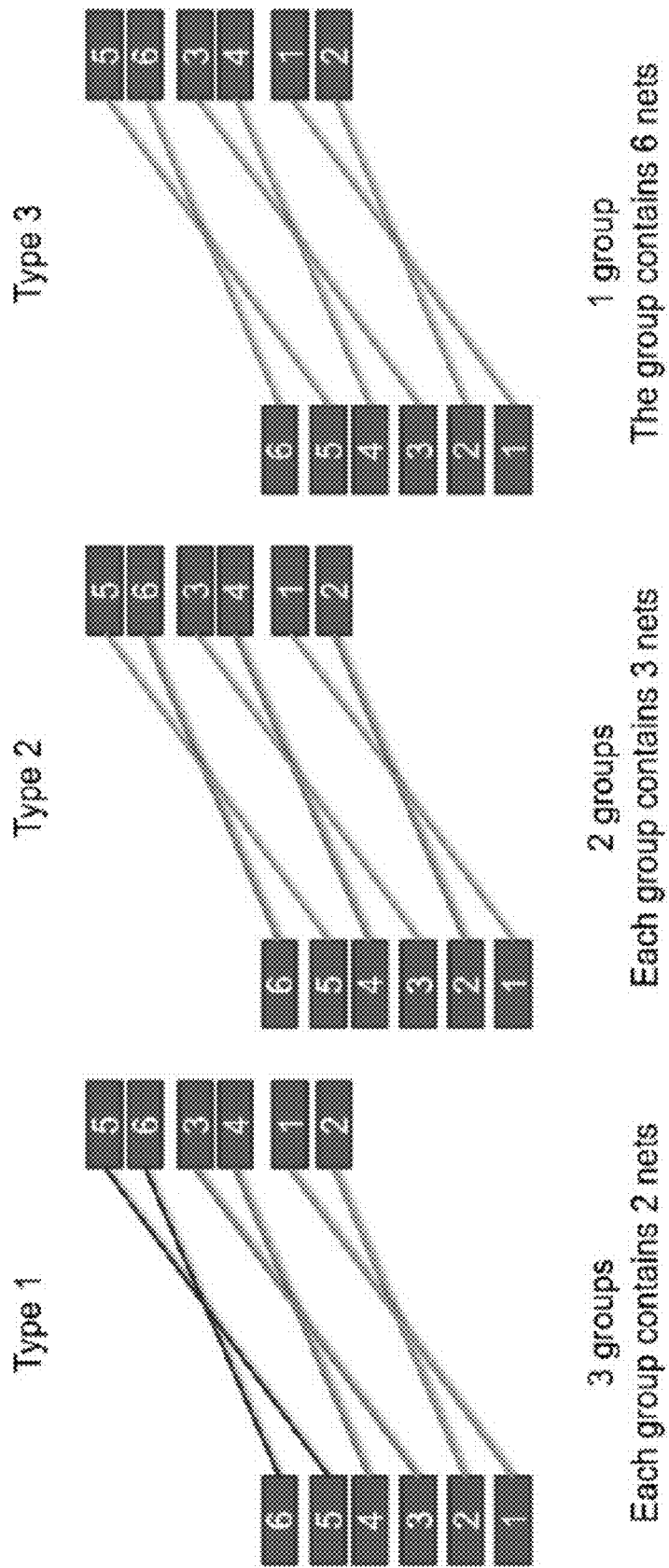
FIG. 4 illustrates different ways of grouping a set of nets that have interleaved pin ordering in accordance with some embodiments described herein.

FIG. 4 illustrates different ways of grouping a set of nets that have interleaved pin ordering in accordance with some embodiments described herein. The three net grouping are labeled as "Type 1," "Type 2," and "Type 3." In "Type 1," three net groups were created, each group containing two nets: (1,2), (3,4), (5,6). In "Type 2," two net groups were created, each group containing three nets: (1,3,5), (2,4,6). Finally, in "Type 3," a single net group was created containing all six nets: (1,2,3,4,5,6).

To prevent the case where only a few nets are grouped into the same group, there is a min net count constraint. It means that once the number of nets inside a group is less than the min net count constraint, the group will be removed and the nets in the group could be grouped with other groups if possible. This constraint prevents the creation of too many groups with a small number of nets. There is another constraint, max net count, to control how many nets are grouped together. In some situations, it is not optimal to group too many nets in the same group. For example, one reason why we may want to limit the number of nets in a group is because the trunks of nets in the same group will be planned in the same layer with a regular pattern, and if the channel is not wide enough to accommodate all trunks, we will have a congestion problem. Therefore, one reason for the maximum net count constraint is to force the net grouping process to split big groups into small groups to reduce or avoid congestion. When nets are split into multiple groups, the nets in different groups can be planned on different metal layers, thereby allowing the nets to share the same tracks in the channel (albeit on different metal layers).

Figure 5A:
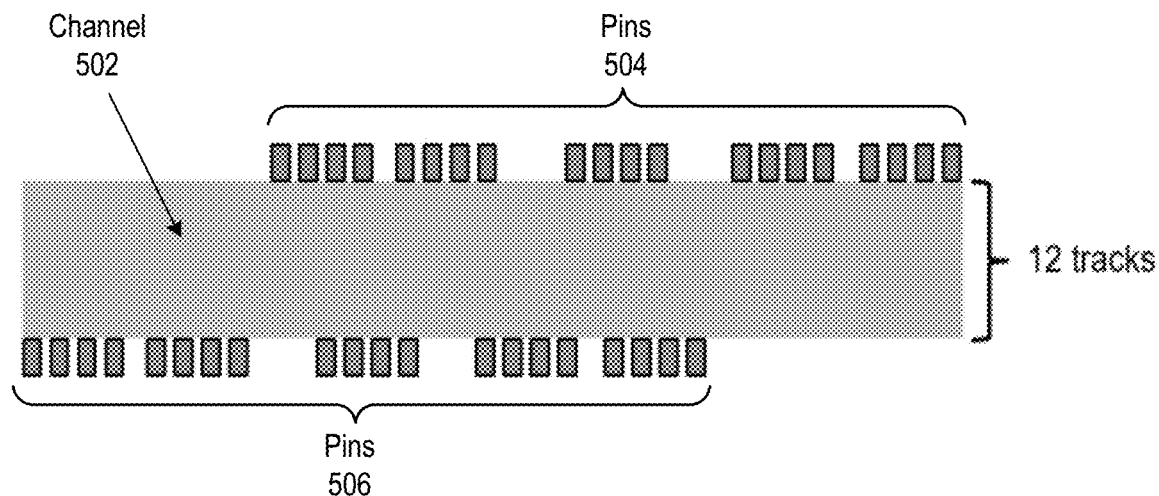
FIGS. 5A-5B illustrate how minimum and maximum counts can be used during net grouping in accordance with some embodiments described herein.
Figure 5B:
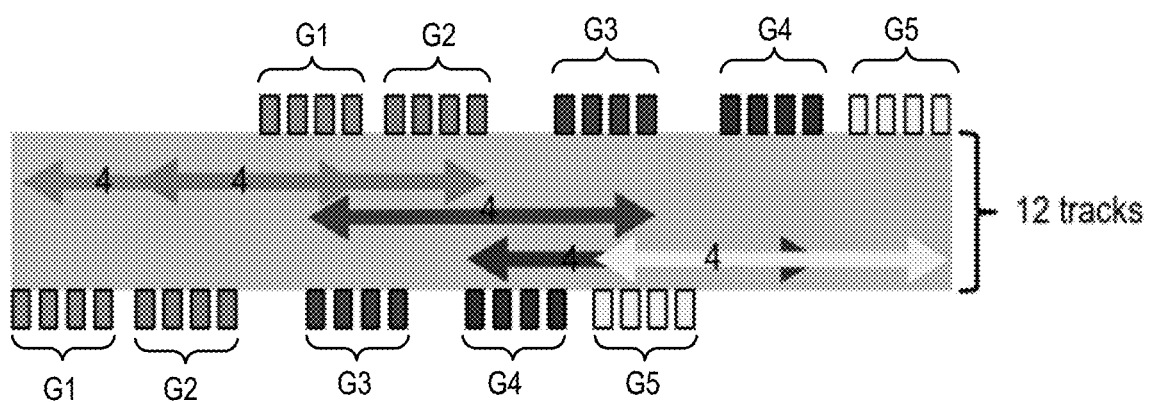

FIGS. 5A-5B illustrate how minimum and maximum counts can be used during net grouping in accordance with some embodiments described herein. A total of 20 nets exist that electrically connect pins 504 to pin 506. These nets are to be routed in channel 502 that has a capacity to accommodate 12 tracks. In FIG. 5A, all nets are grouped into a single group. To route this single group of nets, we need 20 tracks. However, there are only 12 tracks in channel 502. So, this net grouping is not routable. On the other hand, in FIG. 5B, a maximum net count constraint is set to four. This causes the net grouping process to create five groups (shown as G1 through G5 in FIG. 5B) with four nets in each group. These five groups can be routed in different layers and fit into the channel. Specifically, the 12 tracks can be divided into three sets of tracks (T1, T2, and T3), wherein each set of tracks has four tracks. Groups G1 and G2 can be routed over the same four tracks, say set of tracks T1, but in different metal layers. Group G3 can be routed over set of tracks T2. Groups G4 and G5 can be routed over set of tracks T3, but in different metal layers. In this manner, the 20 nets can be routed over the available 12 tracks.

If pins are placed within a certain distance, it is preferred to group them together. However, if one pin is placed far away from next pin, they shouldn't be grouped together. The longest grouping distance is a criterion to determine if two pins should be grouped. If the distance between two pins exceeds the longest grouping distance, they won't be grouped. Horizontal and vertical pins could have different grouping distance.

Figure 6A:
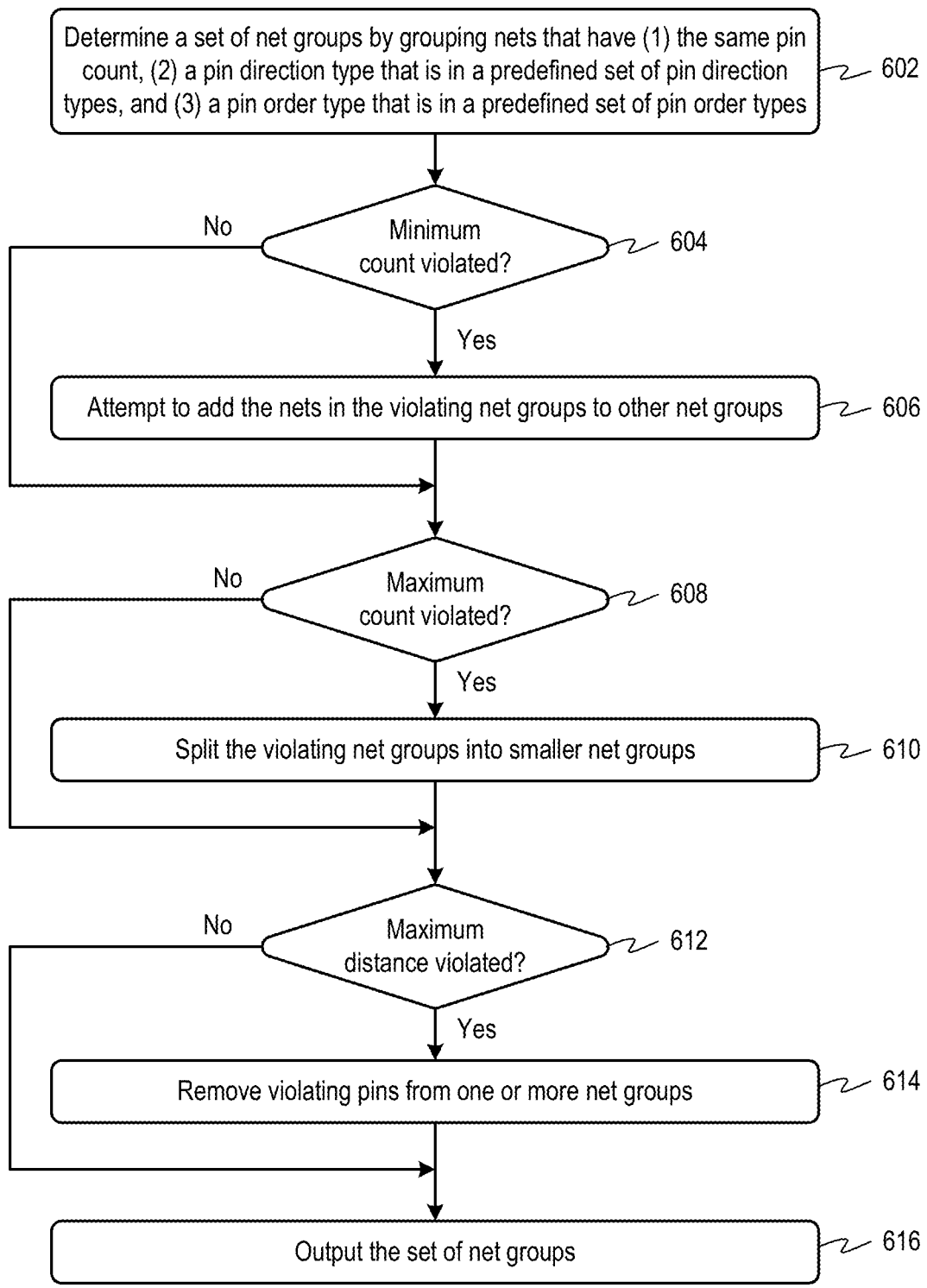
FIG. 6A illustrates a process for grouping nets in accordance with some embodiments described herein.

FIG. 6A illustrates a process for grouping nets in accordance with some embodiments described herein. The process can begin by determining a set of net groups by grouping nets that have (1) the same pin count, (2) a pin direction type that is in a predefined set of pin direction types, and (3) a pin order type that is in a predefined set of pin order types (step 602). Next, the process can check if the minimum count constraint was violated (step 604). Recall that each net group is required to have a minimum number of nets in it, and if a net group has fewer nets than the required minimum, then the net group violates the minimum count constraint. If violating net groups exist, then the process can attempt to add the nets in the violating net groups to other net groups (step 606). If no violating groups exist, then the process can skip step 606, and advance to step 608. In step 608, the process can check if the maximum count constraint was violated. Recall that each net group is required to have less than a maximum number of nets in it, and if a net group has more nets than the maximum number, then the net group violates the maximum count constraint. If violating net groups exist, then the process can split the violating net groups into smaller net groups (step 610). If no violating net groups exist, then the process can skip step 610, and advance to step 612. In step 612, the process can check if the maximum distance constraint was violated. Recall that pins within a net group must be within a maximum distance of each other. If the distance between two pins (in some embodiments, the two pins are adjacent pins) in a net group is greater than the maximum distance, then the pins violate the maximum distance constraint, and one of the pins has to be removed from the net group (i.e., the pin and the net that includes the pin is removed). If violating pins exist in one or more net groups, then the process can remove the violating pins (the the associated nets) from the one or more net groups (step 614). If no violating pins exist, then the process can skip step 614, and advance to step 616. In step 616, the process can output the set of net groups.

Once nets have been grouped, some embodiments can then perform trunk planning. Trunk planning is an iterative process where the grouped nets are routed like a bus, i.e., their trunks are planned together. In other words, the nets in a net group are planned together for trunk assignment purposes. Specifically, during trunk planning, the order of net groups is first determined and then each net group is planned one by one.

Figure 6B:
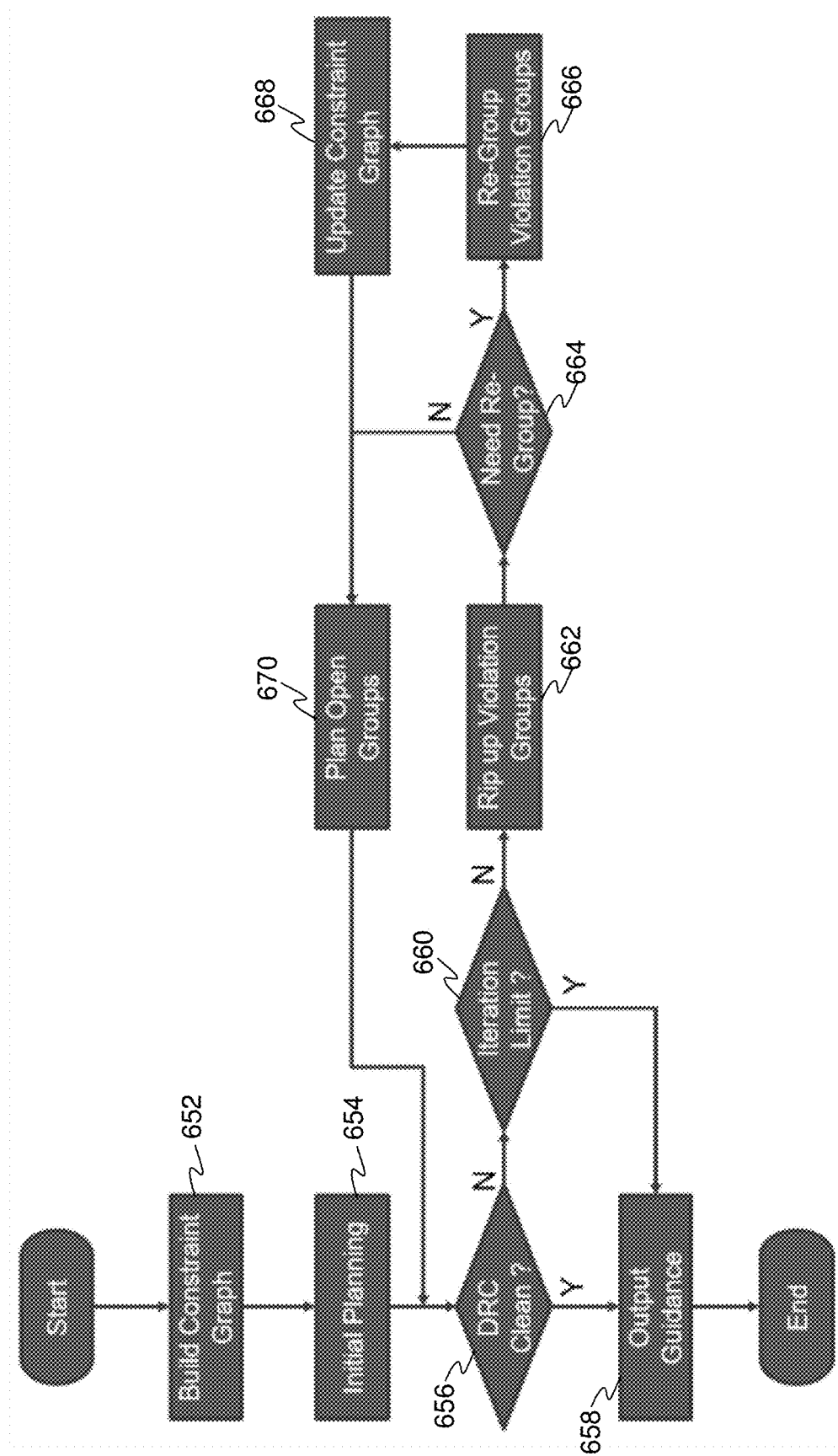
FIG. 6B illustrates a process for trunk planning in accordance with some embodiments described herein.

FIG. 6B illustrates a process for trunk planning in accordance with some embodiments described herein. To begin, a constraint graph is built for determining routing orders (step 652). Then initial planning is completed (step 654). The initial planning uses a global router. Next, the plan produced by the global router is checked for design rule check (DRC) violations (step 656). If the planning result is DRC clean ("Y" branch out of step 656), then guidance for detailed routing is generated (step 658). Otherwise ("N" branch out of step 656), planning results are refined by a rip-up and reroute process (steps 660 through 670). In the rip-up and reroute process, the embodiment first checks if an iteration limit has been reached (step 660). If so ("Y" branch out of step 660), the process proceeds to step 658. Otherwise ("N" branch out of step 660), the process rips-up a group of nets which have violations (step 662). Then, the process checks if there is a wide-enough channel that could route the group of nets, i.e., the process checks if a re-grouping is required (step 664). If no channel can be used ("Y" branch out of step 664), then the process regroups the nets in the ripped-up group into smaller groups (step 666). Since the grouping has changed, the process updates the constraint graph to reflect the new net groupings and the new constraints (step 668). Next, the process plans all open groups, i.e., the net groups for which trunk planning has not been completed (step 670). The process then returns to step 656, and continues until a DRC clean trunk plan has been generated, or the iteration limit has been reached.

Figure 7B:
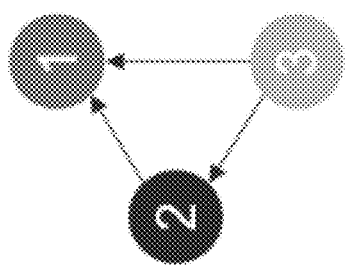
FIGS. 7A-7D illustrate how a constraint graph can be generated for a set of net groups in accordance with some embodiments described herein.
Figure 7D:
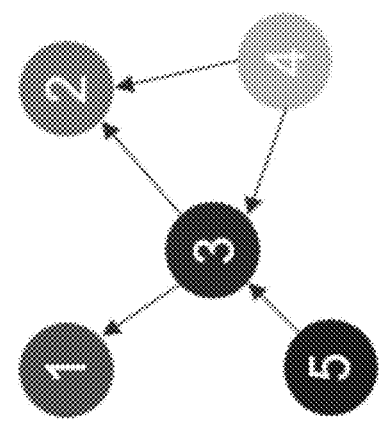
Figure 7A:
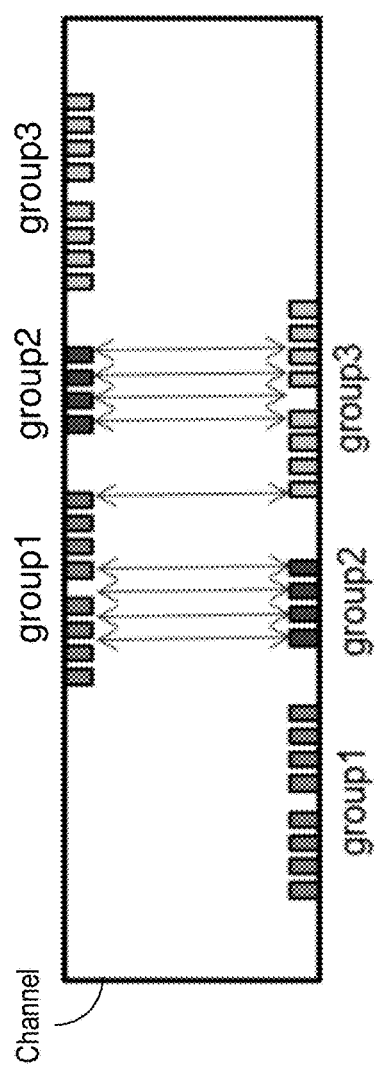

FIGS. 7A-7D illustrate how a constraint graph can be generated for a set of net groups in accordance with some embodiments described herein. The constraint graph is built based on the pin locations. Suppose all pins shown in FIGS. 7A-7D are on the same metal layer. FIG. 7A shows the initial grouping for the given design. The nets in the same group are illustrated using the same shade of gray. Next, the process checks the opposite side of the channel to see if there are pins on the same layer. FIG. 7B illustrates a conflict graph that was generated based on the net groupings and pin locations shown in FIG. 7A. Note that there are conflicts between pins because they are facing each other across the channel. Specifically, group1 pins face group2 pins, group2 pins face group1 pins, and one group1 pin faces one group3 pin.

FIG. 7B shows the constraint graph (or conflict graph) that was generated from FIG. 7A. Each node (which is represented by a circle) in the constraint graph represents a net group. For example, the three circles in FIG. 7B represent the three net groupings shown in FIG. 7A. The edges between two nodes mean that the two groups have a conflict. For example, an arrow from node 3 to node 2 means that group3 is in conflict with group2. The process creates a directional arrow from pins on the bottom/left boundary to the top/right boundary.

Figure 7C:
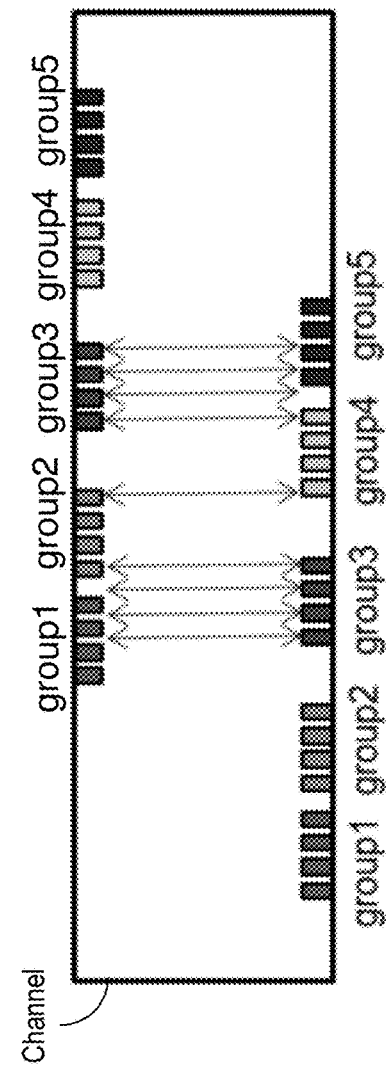

On the other hand, if nets are grouped into five groups as shown in FIG. 7C, the constraint graph will look like the one shown in FIG. 7D. Because the constraint graph represents the conflict between pins, if two group pins are not on the same layer, they won't have a conflict, and therefore they will not create a constraint. An arrow points from group A to group B means that group A should be routed in the left/bottom side of group B, otherwise there will be short violations in between pin connections.

Some embodiments described herein can use the constraint graph to determine how many tracks are needed for routing all groups. To determine the number of tracks needed, the process can determine the maximum-weighted length of the graph. Specifically, the process can begin from all nodes that do not have an arrow pointing into it, and traverse the graph. During the traversal, the process can accumulate the number of nets of each node in the traversed path. The accumulated number of nets is the weight of the traversed path. Once the traversal step has been completed for all nodes that do not have an arrow pointing to it, the process can determine the maximum-weighted traversed path. This is the minimum number of tracks needed to route all net groups.

For example, consider the constraint graph shown in FIG. 7D. In this graph, each node corresponds to a group that contains four nets. Nodes 4 and 5 do not have any incoming edges (i.e., arrows pointing to them). Thus, we begin from these nodes and determine the highest-weighted path that we can find. For node 4, the path is {4→3→1}; for node 5, the path is {5→3→2}. Both of these paths have the weight 12 because there are three nodes in each of those paths, and each node corresponds to four nets. Thus, the weight of the maximum-weighted path is 12. So, to route all groups in FIG. 7C, we need at least 12 tracks. If the number of tracks in the channel is less than 12, then it won't be possible to route the nets. In that case, the grouping will need to be refined by splitting groups that have a conflict into smaller groups. Doing this can reduce the maximum-weighted length of the graph, and reduce the number of tracks needed.

Figure 8:
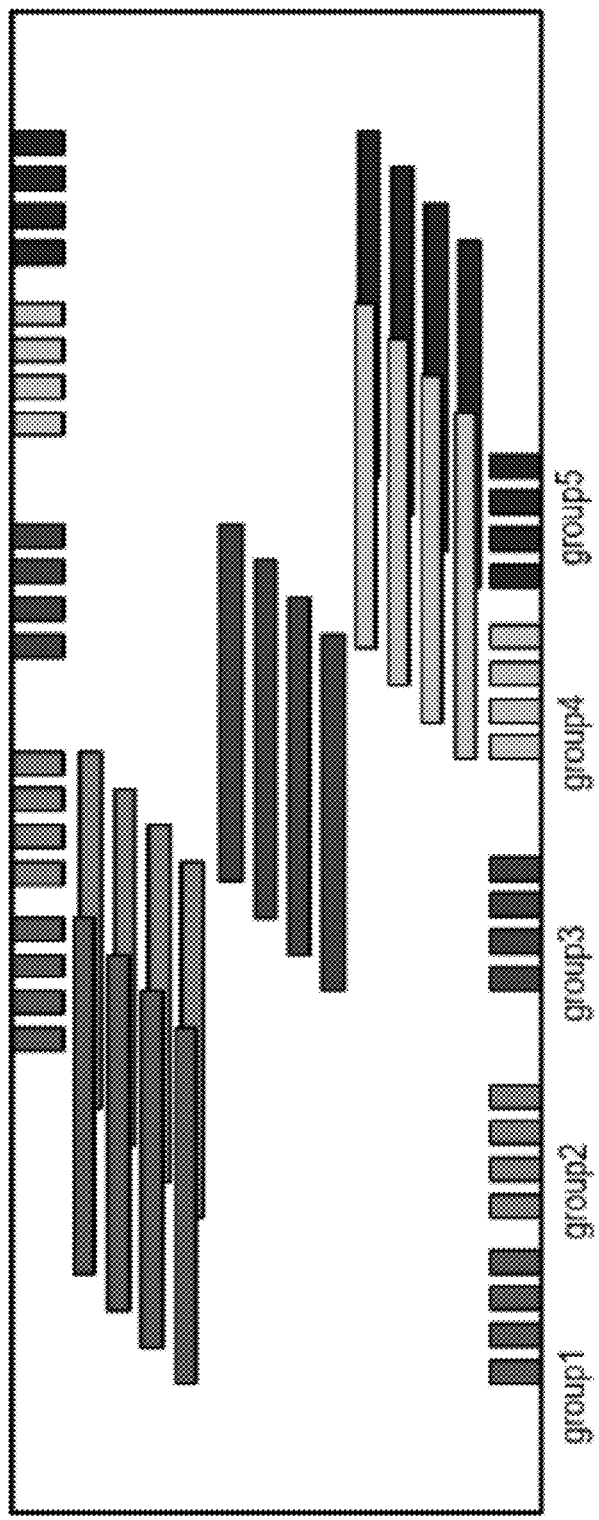
FIG. 8 illustrates an example of a trunk plan that was generated based on a constraint graph in accordance with some embodiments described herein.

The group without any arrows pointing it to will be routed first (e.g., groups 4 and 5 in FIG. 7C). After the group is routed, the edges that originate from that node are removed or marked as hidden in the constraint graph. The process is repeated, i.e., after the edges are removed or marked hidden, the next node that does not have any arrows pointing to it is selected and routed. If there are cycles found in the graph, then the process can randomly select a group in the cycle and route it. If the IC design includes nets that were not part of any grouping, then those nets are planned after all groups have been planned. FIG. 8 illustrates an example of a trunk plan that was generated based on a constraint graph in accordance with some embodiments described herein. Specifically, the trunk plan illustrated in FIG. 8 is based on the constraint graph shown in FIG. 7D.

As mentioned above, a global router is used to do the trunk planning (note that global routing is a well-known process that will be known to a person having ordinary skill in the art). After global routing, a segment assignment process can be invoked to do the detailed planning for bus trunks.

Figure 9A:
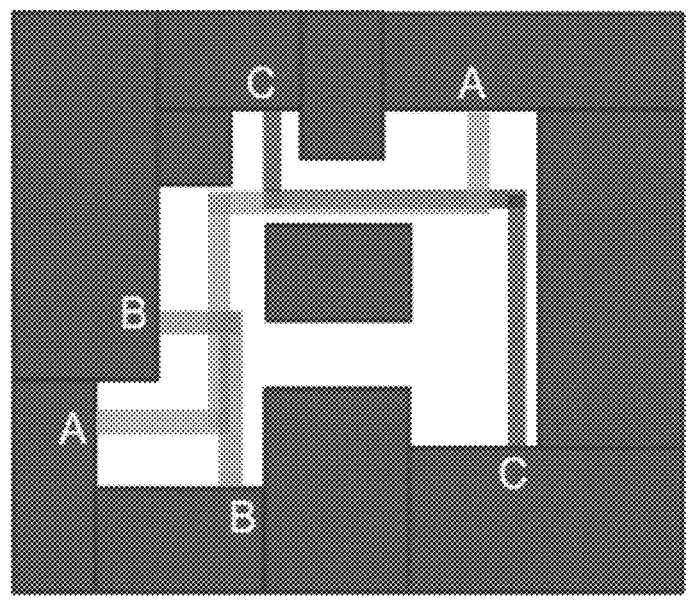
FIGS. 9A-9D illustrate an example of performing initial planning, segment assignment, and rip-up and reroute in accordance with some embodiments described herein.
Figure 9B:
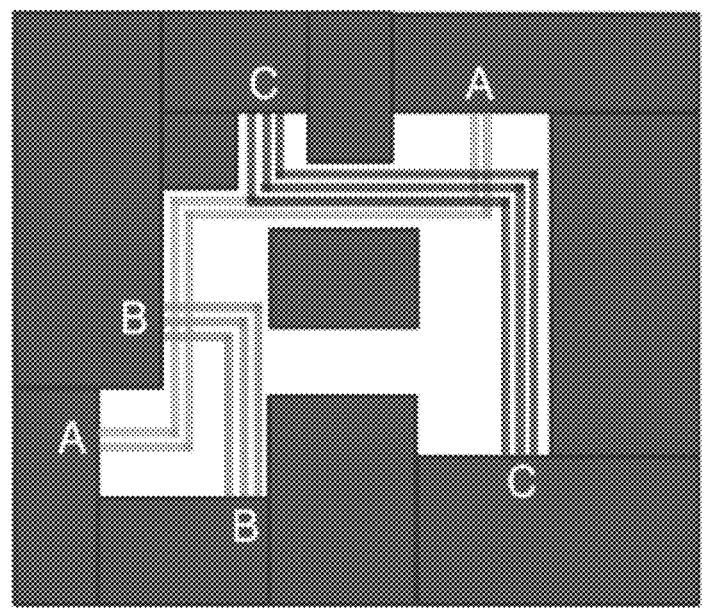
Figure 9C:
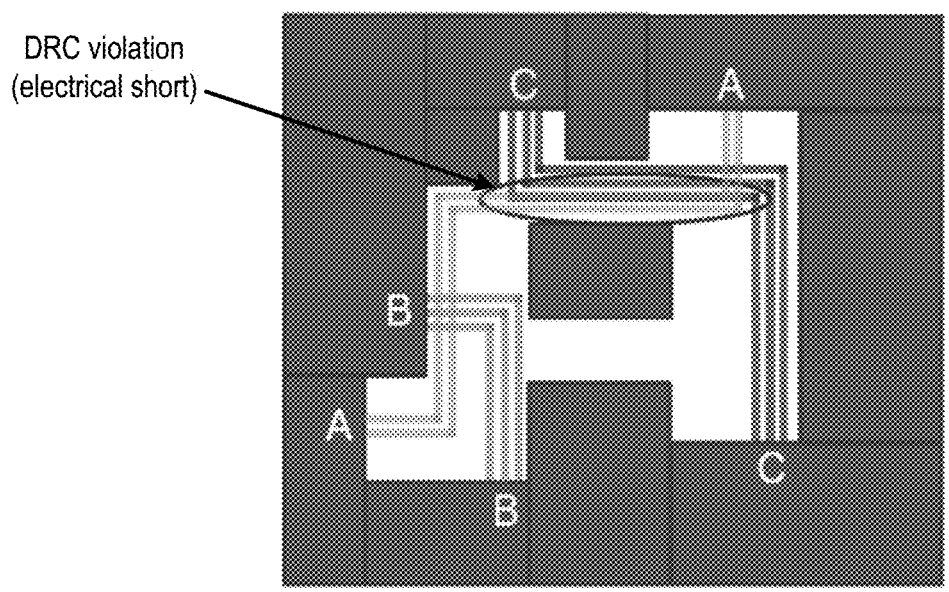
Figure 9D:
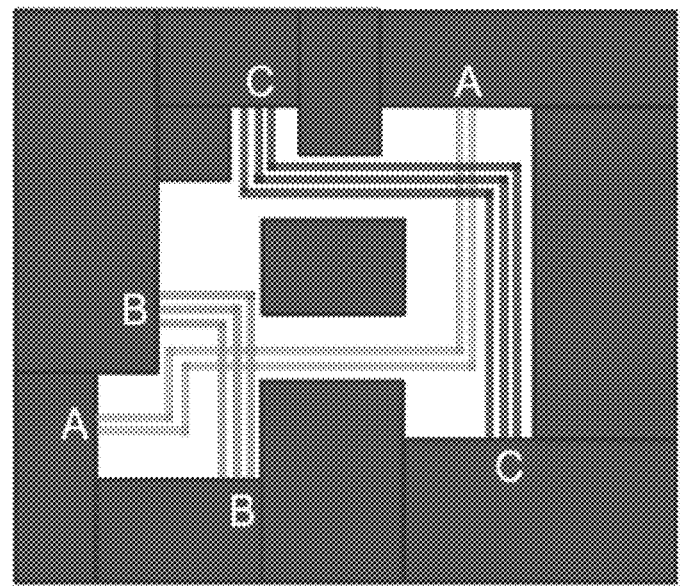

FIGS. 9A-9D illustrate an example of performing initial planning, segment assignment, and rip-up and reroute in accordance with some embodiments described herein. As shown in FIG. 9A, the three groups A, B and C are planned. Since it is a planning result, the segments are allowed to overlap. In FIG. 9B, a segment assignment process is used to assign the detailed location for all trunks of every net. However, note that there is an electrical-short violation between the groups A and C as shown in FIG. 9C. Hence, violating group A must be ripped-up and re-planned in another channel. The final result is shown in FIG. 9D.

Some embodiments perform track sharing, which means to plan trunks of multiple net groups on the same tracks. Track sharing allows more routing resources to be preserved for other nets, especially, in the corner potion of bus trunks. Some embodiments described herein support track sharing, and can compact bus trunks together.

Figure 10A:
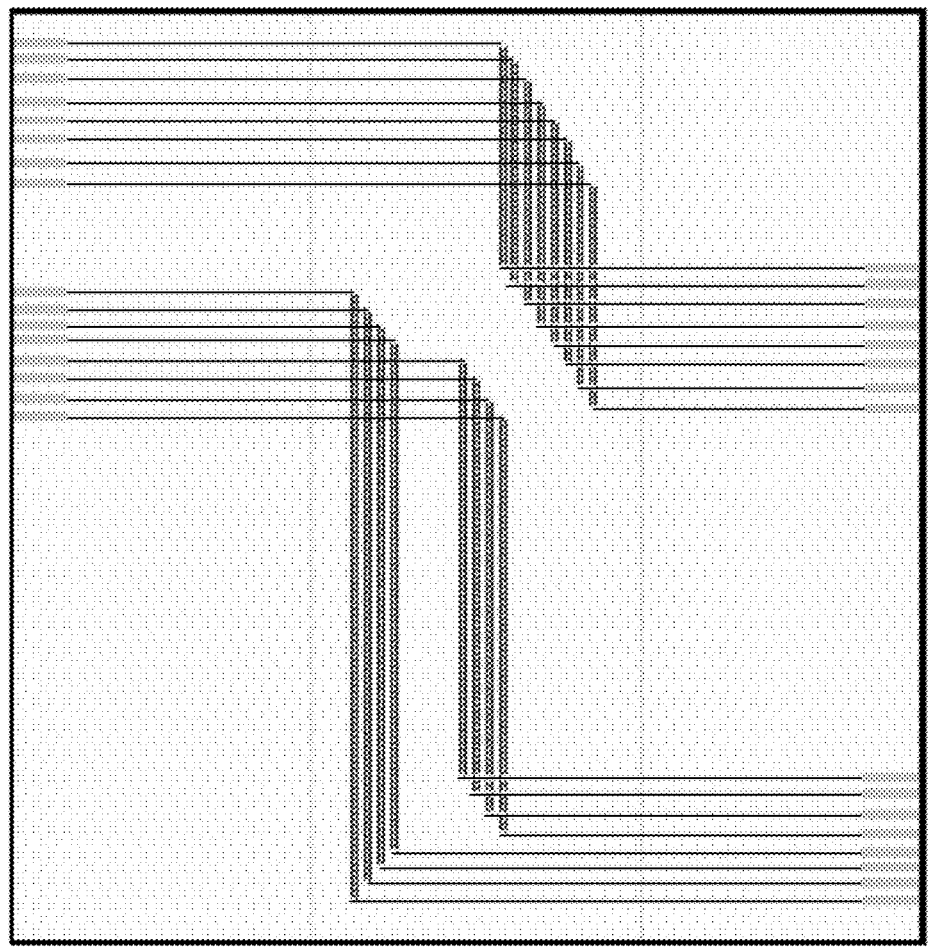
FIGS. 10A-10B illustrates track sharing in accordance with some embodiments described herein.
Figure 10B:
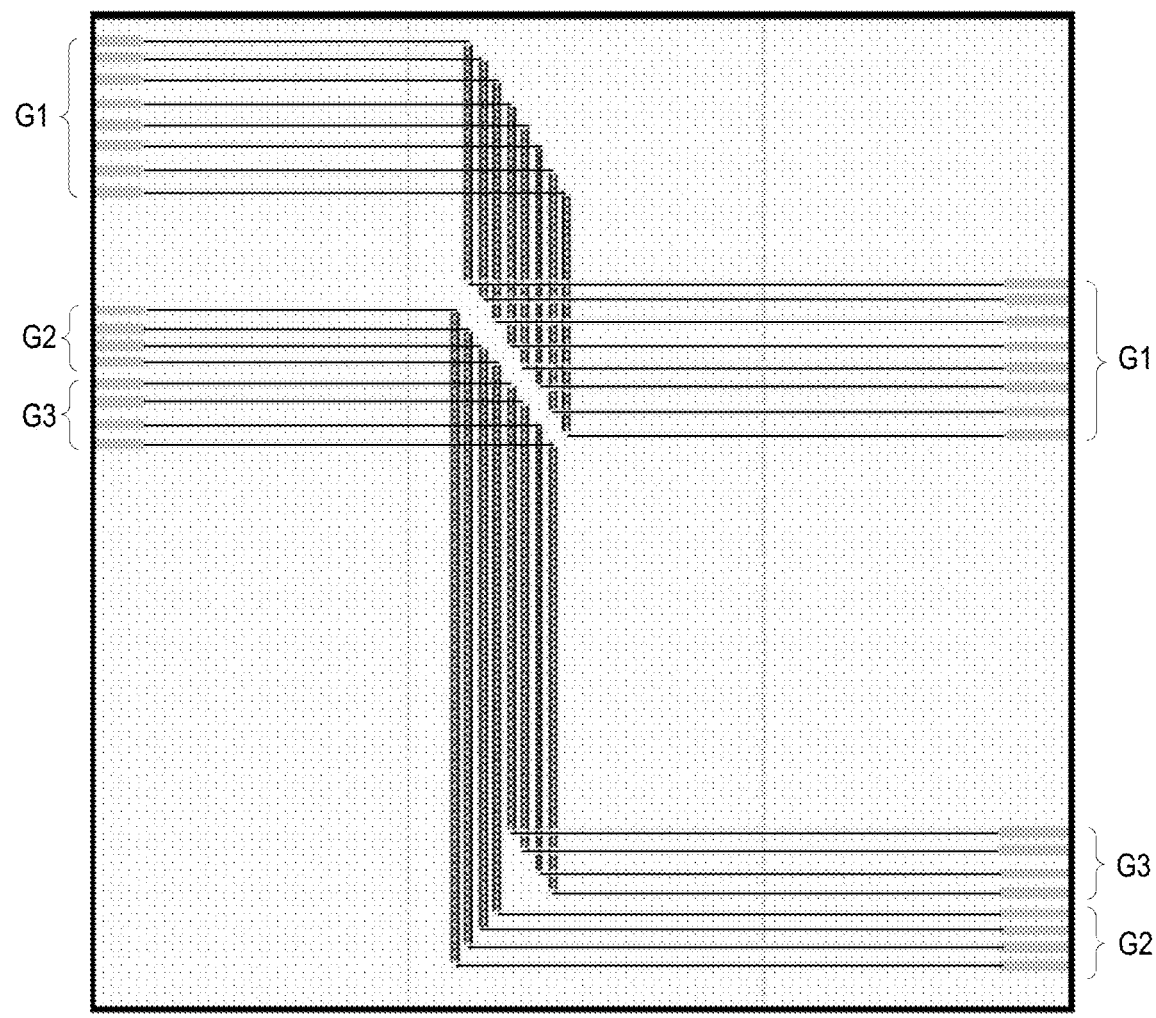

FIGS. 10A-10B illustrates track sharing in accordance with some embodiments described herein. FIG. 10A illustrates the result when track sharing and trunk compaction is not used. In FIG. 10B, track sharing and trunk compaction is performed between three groups of nets—G1, G2, and G3. To have better track sharing and trunk compaction, some embodiments can determine the corner type (cross/river) of all bus trunks.

Figure 11A:
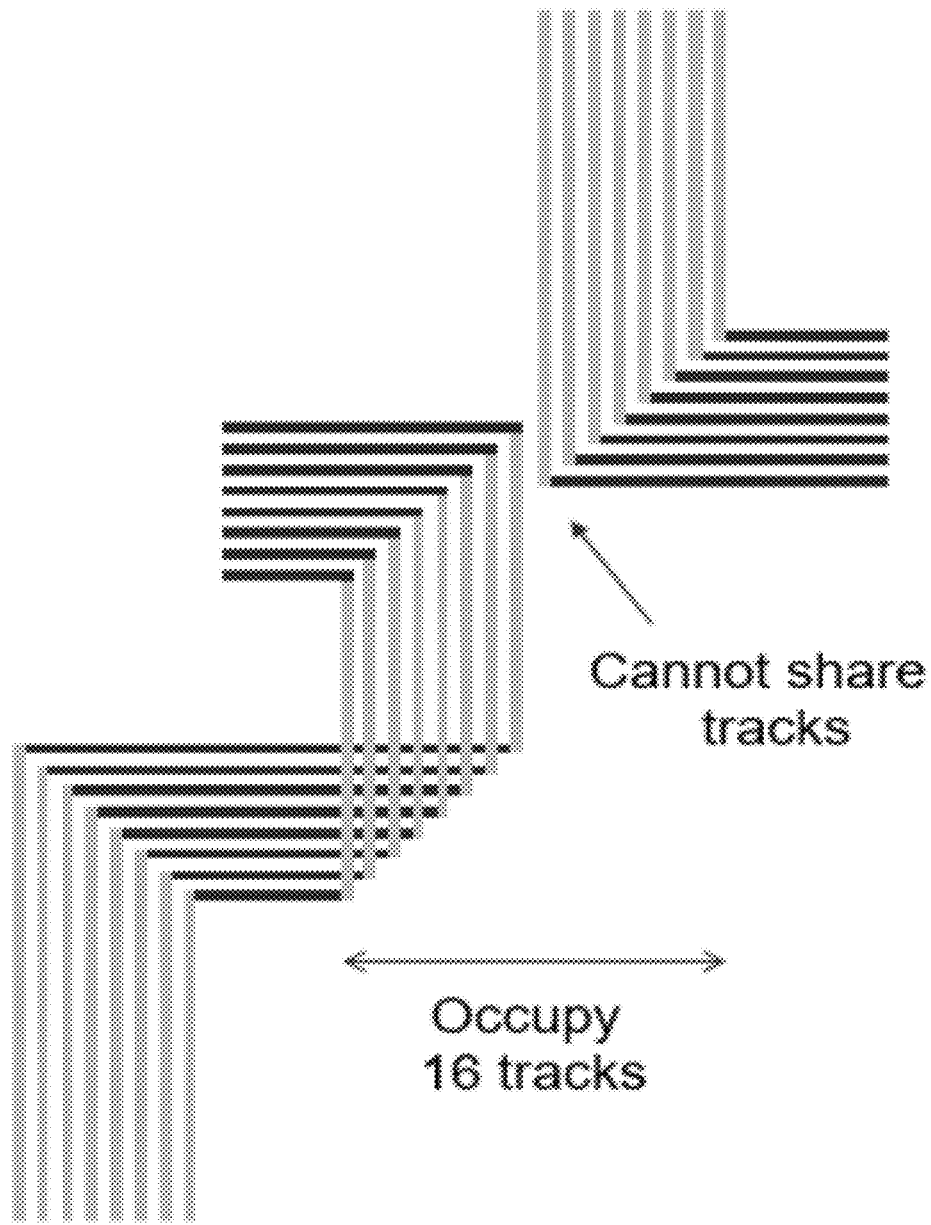
FIGS. 11A-11B illustrate an example of corner optimization for better track sharing in accordance with some embodiments described herein.
Figure 11B:
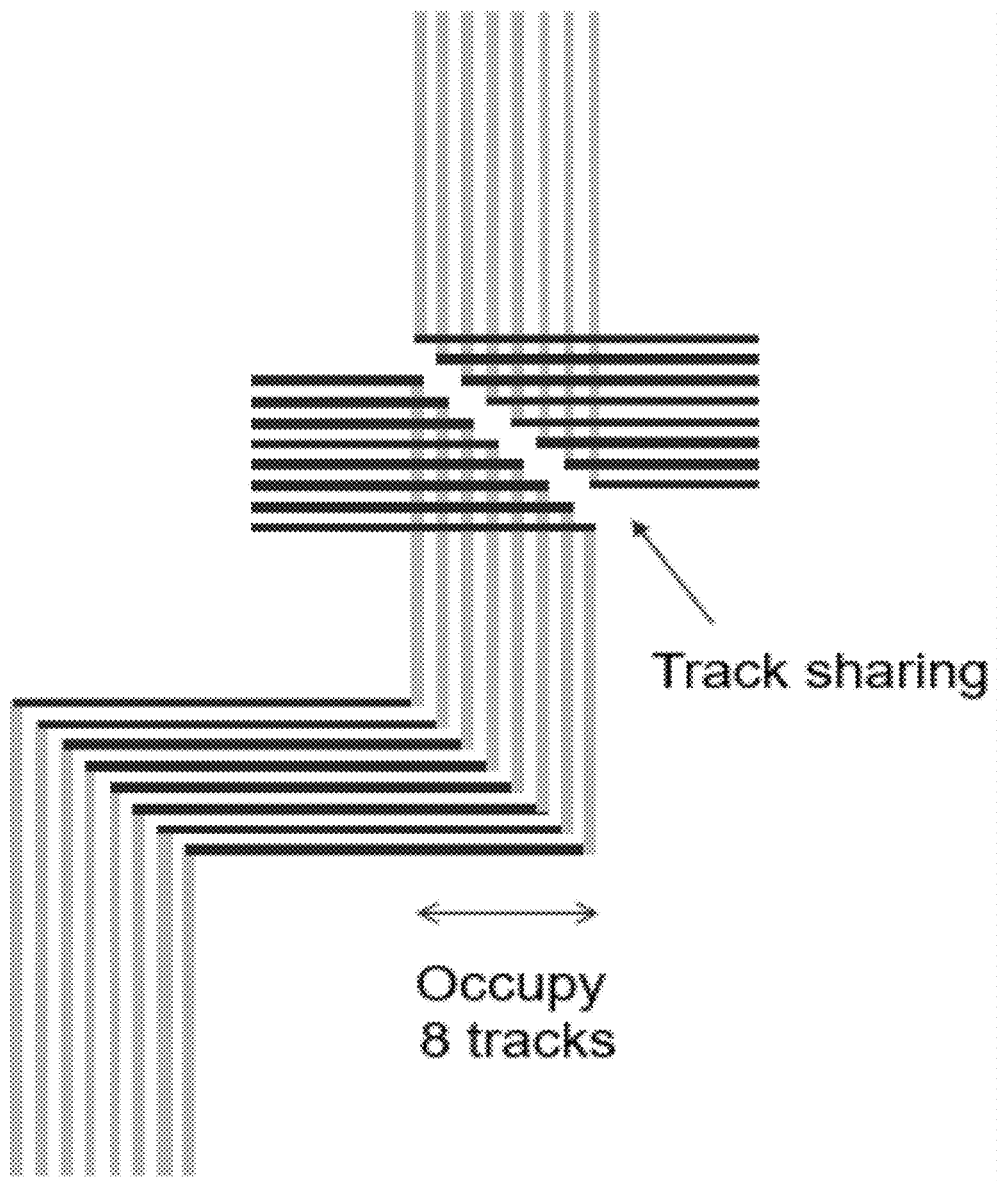

FIGS. 11A-11B illustrate an example of corner optimization for better track sharing in accordance with some embodiments described herein. Without corner optimization, 16 tracks are needed for the two net groups, as shown in FIG. 11A. FIG. 11B shows how track sharing with corner optimization can be used to reduce the number of routing resources that are required (8 tracks in FIG. 11B versus 16 tracks in FIG. 11A).

The output of trunk planning can be provided as guidance to the detailed router. The detailed router then tries to route nets on the locations specified by the guidance. Note that the guidance generated by the trunk planning process may not be always DRC free from the point of view of the detailed router. In that case, detailed router may need to shift the routing a little bit to avoid DRC violations. If there is no free space left to shift the routing shapes, then the detailed router can perform a detailed route search to determine a DRC clean path (the detailed router ignores the guidance during the search).

Figure 12:
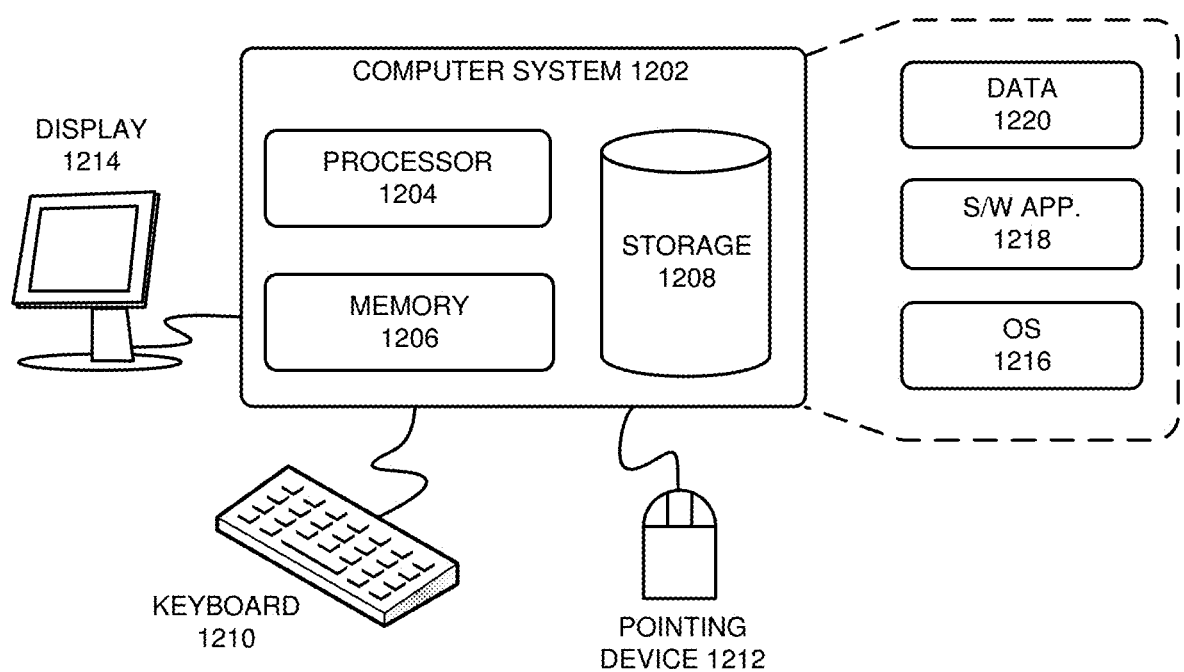
FIG. 12 illustrates a computer system in accordance with some embodiments described herein.

FIG. 12 illustrates a computer system in accordance with some embodiments described herein. The term "computer" or "computer system" generally refers to a hardware-based system that can perform computations required for the design and manufacture of ICs. Computer system 1202 can include processor 1204, memory 1206, and storage device 1208. Computer system 1202 may include multiple processors, and processor 1204 may include multiple cores. Specifically, memory locations in memory 1206 can be addressable by processor 1204, thereby enabling processor 1204 to access (e.g., via load/store instructions) and manipulate (e.g., via logical/floating point/arithmetic instructions) the data stored in memory 1206. Computer system 1202 can be coupled to display device 1214, keyboard 1210, and pointing device 1212. Storage device 1208 can store operating system 1216, software application 1218, and data 1220. Data 1220 can include input required by software application 1218 and/or output generated by software application 1218.

Computer system 1202 may automatically (or with user help) perform one or more operations that are implicitly or explicitly described in this disclosure. Specifically, computer system 1202 can load software application 1218 into memory 1206, and software application 1218 can then be used to perform automatic net grouping and routing. The resulting IC design is expected to have better performance and/or quality of results (QoR) because the nets were automatically grouped and routed by using the techniques and systems described in this disclosure.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output (I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract' } how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions which, when executed by a processor, cause the processor to:
   determine a set of net groups by automatically grouping bus-like nets which are not already part of a net group, and which have (1) a same pin count, (2) a pin direction type that is in a predefined set of pin direction types, and (3) a pin order type that is in a predefined set of pin order types;
   generate routing guidance by performing trunk planning for each net group; and
   perform detailed routing for each net in each net group by using the routing guidance.

2. The non-transitory computer-readable storage medium of claim 1, wherein the predefined set of pin direction types comprises a vertical-vertical pin direction type, a vertical-horizontal pin direction type, a horizontal-vertical pin direction type, and a horizontal-horizontal pin direction type.

3. The non-transitory computer-readable storage medium of claim 2, wherein the predefined set of pin order types comprises a same order type, a reverse order type, and an interleaved order type.

4. The non-transitory computer-readable storage medium of claim 1, wherein said generating the routing guidance comprises constructing a constraint graph, wherein the constraint graph is a directed graph comprising a set of nodes and a set of directed edges, wherein each node in the constraint graph represents a net group, and each directed edge in the constraint graph represents a routing resource constraint between two net groups.

5. The non-transitory computer-readable storage medium of claim 4, wherein the method comprises determining a minimum number of tracks required for routing the set of net groups by determining a maximum-weighted path in the constraint graph.

6. The non-transitory computer-readable storage medium of claim 5, wherein the method comprises re-grouping nets in response to determining that the minimum number of tracks is greater than a capacity of a channel through which the net groups are to be routed.

7. The non-transitory computer-readable storage medium of claim 1, wherein after performing detailed routing for each net in each net group by using the routing guidance, the method comprises performing detailed routing on nets that are not in the set of net groups.

8. An apparatus, comprising:
a memory storing instructions; and
a processor, coupled with the memory and to execute the instructions, the instructions when executed causing the processor to:
  determine a set of net groups by automatically grouping bus-like nets which are not already part of a net group, and which have (1) a same pin count, (2) a pin direction type that is in a predefined set of pin direction types, and (3) a pin order type that is in a predefined set of pin order types;
  generate routing guidance by performing trunk planning for each net group; and
  perform detailed routing for each net in each net group by using the routing guidance.

9. The apparatus of claim 8, wherein the predefined set of pin direction types comprises a vertical-vertical pin direction type, a vertical-horizontal pin direction type, a horizontal-vertical pin direction type, and a horizontal-horizontal pin direction type.

10. The apparatus of claim 9, wherein the predefined set of pin order types comprises a same order type, a reverse order type, and an interleaved order type.

11. The apparatus of claim 8, wherein said generating the routing guidance comprises constructing a constraint graph, wherein the constraint graph is a directed graph comprising a set of nodes and a set of directed edges, wherein each node in the constraint graph represents a net group, and each directed edge in the constraint graph represents a routing resource constraint between two net groups.

12. The apparatus of claim 11, wherein the method comprises determining a minimum number of tracks required for routing the set of net groups by determining a maximum-weighted path in the constraint graph.

13. The apparatus of claim 12, wherein the method comprises re-grouping nets in response to determining that the minimum number of tracks is greater than a capacity of a channel through which the net groups are to be routed.

14. The apparatus of claim 13, wherein after performing detailed routing for each net in each net group by using the routing guidance, the method comprises performing detailed routing on nets that are not in the set of net groups.

15. A method for net grouping and routing, the method comprising:
determining, by a processor, a set of net groups by automatically grouping bus-like nets which are not a ready part of a net group, and which have (1) a same pin count, (2) a pin direction type that is in a predefined set of pin direction types, and (3) a pin order type that is in a predefined set of pin order types;
generating routing guidance by performing trunk planning for each net group; and
performing detailed routing for each net in each net group by using the routing guidance.

16. The method of claim 15, wherein the predefined set of pin direction types comprises a vertical-vertical pin direction type, a vertical-horizontal pin direction type, a horizontal-vertical pin direction type, and a horizontal-horizontal pin direction type.

17. The method of claim 16, wherein the predefined set of pin order types comprises a same order type, a reverse order type, and an interleaved order type.

18. The method of claim 15, wherein said generating the routing guidance comprises constructing a constraint graph, wherein the constraint graph is a directed graph comprising a set of nodes and a set of directed edges, wherein each node in the constraint graph represents a net group, and each directed edge in the constraint graph represents a routing resource constraint between two net groups.

19. The method of claim 18, comprising determining a minimum number of tracks required for routing the set of net groups by determining a maximum-weighted path in the constraint graph.

20. The method of claim 19, comprising re-grouping nets in response to determining that the minimum number of tracks is greater than a capacity of a channel through which the net groups are to be routed.

* * * * *